United States Patent [19]
Wallach
[11] Patent Number: 5,075,374
[45] Date of Patent: Dec. 24, 1991

[54] POLYESTER-POLYCARBONATE-GRAFT POLYMER ALLOY

[75] Inventor: Morton L. Wallach, Leominster, Mass.

[73] Assignee: Polysar Financial Services S.A., Frigourg, Switzerland

[21] Appl. No.: 433,160

[22] Filed: Nov. 8, 1989

[51] Int. Cl.[5] .............................................. C08L 69/00

[52] U.S. Cl. ........................................ 525/67; 525/64; 525/92

[58] Field of Search ............................. 525/64, 67, 92; 524/504

[56] References Cited

U.S. PATENT DOCUMENTS

| | | | |
|---|---|---|---|
| 3,218,372 | 11/1965 | Okamura | 525/439 |
| 4,172,859 | 10/1979 | Epstein | 525/109 |
| 4,866,123 | 9/1989 | Wittmann | 525/67 |
| 4,866,125 | 9/1980 | Lo et al. | 525/67 |
| 4,883,840 | 11/1989 | Cartasegna | 525/67 |

OTHER PUBLICATIONS

Derwent WPI #84-147555/24, O. Boutni et al. Thermoplastic Polyester Moulding Composition.
Derwent WPI #85-082543/14, J. Chung et al. Thermoplastic Blend for Mounding.
Derwent WPI #87-076525/11, Resin Composition for Car Body Moulding.
Derwent WPI #87-356703/51, M. Hongo et al., Composition for Exterior Use in Automobiles.

*Primary Examiner*—John C. Bleutge
*Assistant Examiner*—David Buttner
*Attorney, Agent, or Firm*—Stevens, Davis, Miller & Mosher

[57] ABSTRACT

A blend comprising 40 to 90 weight percent of a polycarbonate; 5 to 45 weight percent of a polyterephthalate ester; and 5 to 45 weight percent of a styrene acrylate terpolymer grafted onto a styrene-butadiene di or tri block polymer shows a good balance of properties including a high impact strength.

4 Claims, 1 Drawing Sheet

POLYESTER-POLYCARBONATE-GRAFT POLYMER ALLOY

FIELD OF THE INVENTION

The present invention relates to polymer blends or alloys based on polycarbonates. Broadly, the polymer alloys comprise 40 to 90 weight percent of polycarbonate, 5 to 45 weight percent of polyesters; 5 to 45 weight percent of a styrene acrylate polymer grafted onto a styrene-butadiene di- or tri- block polymer; and from 0 to 30 weight percent of a polymeric impact modifier.

BACKGROUND OF THE INVENTION

Polycarbonates are a versatile class of resins. It is desirable to improve the chemical resistance and processing properties of polycarbonates without detrimentally affecting the other properties of polycarbonate. It is also desirable to reduce the price of polycarbonates by blending them with other polymers without reducing the properties of the polycarbonate.

U.S. Pat. No. 4,172,859 issued Oct. 30, 1979 to Epstein discloses a polymer blend comprising 60 to 99 weight percent of a matrix selected from the group consisting of polyesters such as polyethylene terephthalate (PET) and polybutylene terephthalate (PBT) or polycarbonate (PC) and from 1 to 40 weight percent of a dispersed phase having a particle size from 0.01 to 1 micron. The dispersed phase is described in very broad terms, but generally appears to relate to random polymers which contain one or more of the following monomers: ethylene, CO, anhydrides of ethylenically unsaturated dicarboxylic acids, epoxides and aromatic sulfonyl azides. The present invention is distinct over Epstein in that it relates to a blend of PET and PC and a styrenic acrylate which is grafted onto a di- or tri-block copolymer. The matrix of the composition of the present invention is a continuous phase of a blend of PET and PC and some of the styrene acrylic polymers. The discontinuous phase is dispersed as particles having a size from 0.05 to about 3 microns. The discontinuous phase is believed to be composed of particles of rubber containing inclusions of the styrene acrylate terpolymer.

Derwent WPI accession number 87-356703/51 which is an abstract of Japanese Patent 63023954 in the name of Mitsubishi Rayon K.K. discloses a blend of PC/polyester/and a polymer which is a graft of a vinyl monomer onto a polyorganosiloxane rubber. The present invention does not contemplate the use of such a grafted polyorganosiloxane.

Derwent WPI accession number 84-147555/24 which is an abstract of E.P. 110222 in the name of General Electric discloses a blend comprising:

(i) 10-90 percent of a polyester
(ii) 0.1-20 percent of linear polyethylene; and
(iii)5-70 percent of a polycarbonate; and
(iv) 2-25 percent of an impact modifier.

The present invention includes a styrene acrylate terpolymer which is not disclosed by this reference.

Derwent WPI accession number 87-076525/11 which is an abstract of Japanese 62030149 in the name of Teijin Chemicals K.K. discloses a blend comprising:

(i) 10-90 weight percent of PC;
(ii) 5-80 weight percent of PET;
(iii)3-20 weight percent of a styrene-(meth)acrylic acid polymer grafted onto a conjugated diene;
(iv) 0.5-10 weight percent of polyethylene; and
(v) 0.5-10 weight percent of butyl rubber.

The present invention does not contemplate the use of butyl rubber.

Derwent WPI accession number 85-082543/14 which is an abstract of EP 135 904 in the name of Mobay discloses a polymer blend comprising:

(i) 30-89.5 weight percent of PET;
(ii) 5-61.5 weight percent PC; and
(iii) 5-50 weight percent of a polymer of styrene and acrylonitrile grafted onto a polybutadiene polymer.

The present invention does not contemplate the use of a graft polymer of the type disclosed in E.P. 135904.

U.S. Pat. No. 4,866,125 issued Sept. 12, 1989 assigned to Polysar Financial Services S.A. discloses blends of PC and a graft copolymer of the type used in the present invention. That patent does not disclose, nor suggest that such blends could be further blended with polyesters.

Accordingly the present invention seeks to provide a novel blend of polycarbonate, polyester and a stryene acrylate grafted onto a block copolymer. The polymer blends of the present invention have improved chemical resistance and processing properties. Optionally, the compositions of the present invention may further contain from 0 up to about 30 weight percent of a rubbery impact modifier.

SUMMARY OF THE INVENTION

The present invention provides a polymer alloy comprising:

a) from 40 to 90 weight percent of one or more homo- and co-polycarbonates selected from the group consisting of hydroquinone, resorcinol and polyphenols of the formula

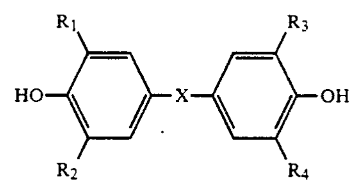

I wherein $R_1$, $R_2$, $R_3$, and $R_4$ are independently selected from the group consisting of a hydrogen atom, a chlorine atom, a bromine atom, and a $C_{1-4}$ alkyl radical; and X is a bond or divalent radical selected from the group consisting of $C_{1-10}$ alkylene radicals; $C_{2-8}$ alkenylene radicals, and $C_{6-8}$ cycloalkylene radicals;

b) from 5 to 45 weight percent of a polymer comprising:
   i) from 50 to 80 weight percent of one or more $C_{8-14}$ aromatic dicarboxylic acids, and $C_{1-4}$ alkyl diesters thereof;
   ii) from 20 to 50 weight percent of one or more monomers selected from the group consisting of $C_{2-10}$ alkylene glycols and $C_{6-10}$ cyclic glycols;
   iii) from 0 to 10 weight percent of one or more $C_{3-12}$ saturated aliphatic di-carboxylic acids; and
c) from 5 to 45 weight percent of a graft copolymer comprising a terpolymer comprising:
   i) 25 to 75 parts by weight of a $C_{8-10}$ vinyl aromatic monomer which is unsubstituted or substituted at the vinyl radical by a $C_{1-2}$ alkyl radical and which may be substituted in the aromatic ring by up to two substituents selected from the group consisting of chlorine and bromine atoms and $C_{1-4}$ alkyl radicals;

ii) from 7 to 30 parts by weight of a copolymerizable $C_{2-8}$ alkyl or hydroxy alkyl ester of a $C_{3-6}$ ethylenically unsaturated acid provided that homopolymers of such esters have a Tg of less than 40° C.; and iii) from 10 to 50 parts by weight of one or more $C_{1-2}$ alkyl acrylates or methacrylates which terpolymer is grafted to from 2 to 20 parts by weight of linear and radial di- or tri- block copolymers having a molecular weight of not less than 75,000 and a styrene content from 20 to 50 weight percent selected from the group consisting of styrene-butadiene di-block copolymers, styrene-butadiene-styrene tri-block copolymers, styrene-isoprene di-block copolymers, styrene-isoprene-styrene tri-block copolymers, partially hydrogenated styrene-butadiene-styrene tri-block copolymers, and partially hydrogenated styrene-isoprene-styrene tri-block copolymers.

DETAILED DESCRIPTION

The polycarbonate is present in the composition in an amount from 40 to 90, preferably 50 to 75 weight percent of the composition.

The polycarbonates useful in accordance with the present invention are prepared in a conventional manner such as by melt transesterification or by the reaction of polyphenols usually bisphenols and phosgene using a two phase boundary process.

Suitable polyphenols include hydroquinone; resorcinol and polyphenols of Formula 1 as described above. Preferred polyphenols are diphenols including: 4,4' dihydroxydiphenyl; 2,2-bis-(4-hydroxyphenyl) propane; 2,4'bis-(4-hydroxyphenyl)-2-methylbutane; 1,1-bis-(4-hydroxyphenyl)-cyclohexane; beta,beta-bis-(4-hydroxyphenyl) -p-diisopropylbenzene; 2,2-bis-(3-chloro-4-hydroxyphenyl) propane, 2,2-bis-(3,5-dichloro-4-hydroxyphenyl) propane; and 2,2-bis-(3,5-dichloro-4-hydroxyphenyl) propane. Generally, aromatic polycarbonates are preferred. A more extensive listing of aromatic polycarbonates occurs in the text "The Chemistry and Physics of Polycarbonates" by Hermann Schnell published by Interscience Publishers, a Division of John Wiley and Sons New York 1964.

Suitable polycarbonates have a weight average molecular weight (MW) from about 10,000 to 150,000 preferably from 20,000 to 100,000 as determined by measuring its relative viscosity in a suitable solvent such as $CH_2Cl_2$ at a concentration of 0.5 g in 100 ml of solvent.

The polyester may be used in an amount from 5 to 45, preferably from 15 to 35 weight percent of the composition. The polyester may comprise from 50 to 80 weight percent of one or more $C_{8-14}$ arnomatic dicarboxylic acids; from 20 to 50 weight percent of one or more $C_{2-10}$ alkylene glycols and/or $C_{6-10}$ cyclic glycols (e.g. cyclohexanediol or cyclohexanedimethanol) and optionally from 0 to 10 weight percent of one or more $C_{3-12}$ saturated aliphatic dicarboxylic acids.

Some $C_{8-14}$ aromatic dicarboxylic acids include terephthalic acid and isophthalic acid. Lower ($C_{1-4}$) alkyl esters of such acids include dimethyl terephthalic acid (DMT). Terephthalic acid and DMT are particularly useful monomers in preparing the polyester. Some $C_{2-10}$ alkylene glycols include ethylene glycol, propylene glycol, and their higher homologues such as 1,10-decamethylene glycol. Particularly useful glycols are ethylene glycol and butylene glycol. These glycols are used to prepare polyethylene terephthlate (PET) and polybutylene terephthalate (PBT). The polyester may be based upon polyethylene terephthalate or polybutylene terephthalate and contain a $C_{6-10}$ cyclic glycol, as in PETG.

If desired, the polyester may contain up to 10, preferably less than 5, weight percent of one or more aliphatic dicarboxylic acids. Some aliphatic dicarboxylic acids include adipic acid; sebacic acid; azelaic acid; and dodecandioic acid.

The third component in the polymer blend is present in an amount from 5 to 45 preferably, 10 to 35 weight percent of the composition. The third component is a graft copolymer of a styrene acrylate grafted on a block copolymer.

The graft copolymer comprises a terpolymer comprising: 25 to 75, preferably from 30 to 65 parts by weight of a $C_{8-10}$ vinyl aromatic monomer; from 7 to 30 preferably 8 to 20 parts by weight of a $C_{2-8}$ alkyl or hydroxyl alkyl ester of a $C_{3-6}$ ethylenically unsaturated carboxylic acid provided that homopolymers of such esters have a Tg of less than 40 preferably less than 35° C.; and from 10 to 50 preferably 15 to 40 parts by weight of one or more $C_{1-2}$ alkyl acrylates or methacrylates, such as methyl methacrylate, which copolymer has been grafted to a linear or radial di-or tri-block copolymer having a molecular weight of not less than 75,000, preferably from 175,000 to 275,000, and a styrene content from 20 to 50 weight percent selected from the group consisting of styrene-butadiene-di-block copolymers styrene-butadiene-styrene tri-block copolymers, styrene isoprene di-block copolymers, styrene-isoprene-styrene tri-block copolymers and partially hydrogenated deratives of the tri-block copolymers.

Suitable vinyl aromatic monc,mers include styrene, alpha methylstyrene, p-methylstyrene, p-tertiary-butylstyrene. Suitable esters include butyl acrylate, ethylhexyl acrylate, and hydroxyethyl acrylate, most preferably butyl acrylate. Preferred block copolymers are styrene-butadiene-styrene tri-block copolymers and styrene-isoprene-styrene tri-block copolymers.

Suitable graft polymers and the process for their preparation are more fully described in U.S. Pat. No. 4,680,337 issued July 14, 1987, assigned to Polysar Financial Services S.A., the entire text of which is hereby incorporated by reference. In general the graft polymers contain from about 8 to 30 percent of the total polymer as gel. The gel is that portion of the polymer which is insoluble in a solvent such as toluene or tetrahydrofuran. In general the weight of the gel is from 1.5 to 4 times the weight of the block copolymer.

The methods for manufacturing the polycarbonate, polyester, random styrene and styrene acrylate-graft polymer are known to those skilled in the art.

The composition of the present invention may further, optionally comprise from 0 to 30, preferably from 1 to 20 weight percent of an impact modifier. Typically, the impact modifier is a rubbery polymer. Preferably it is a particulate polymer. The impact modifier may be homo or block copolymer.

Homopolymers generally comprise homopolymers of $C_{4-6}$ conjugated diolefins which may be substituted by a chlorine atom. Suitable homopolymers include polybutadiene, preferably a high cis-polybutadiene.

Block copolymers may comprise at least a block of a $C_{8-10}$ vinyl aromatic monomer which is unsubstituted or substituted by a $C_{1-4}$ alkyl radical or a chlorine atom, and at least a second block of a $C_{4-6}$ conjugated diolefin which is unsubstituted or substituted by a chlorine atom. Particularly useful polymers comprise di- and tri-block polymers of styrene and butadiene (S-B), styrene-butadiene-styrene (S-B-S), styrene-isoprene di-block copolymers or styrene isoprene styrene tri-block copolymers. Typically, the polymers will contain from 20 to 50 weight percent styrene and have a molecular weight of not less than 75,000, preferably from 175,00 to 275,000. The polymer may be an S-B or S-B-S type polymer which contains from 0 to 5, preferably from 0 to 2 weight percent of a $C_{3-6}$ ethylenically unsaturated carboxylic acid or preferably an anhydride of a $C_{4-6}$ ethylenically unsaturated dicarboxylic acid.

The S-B or S-B-S tri-block polymers as described above may be partially hydrogenated to produce styrene-ethylene-butadiene-styrene (S-E-B-S) type polymers. A particularly useful impact modifier is a (S-E-B-S) hydrogenated block copolymer which contains from 0 to 2.5 preferably from 0.5 to 2.0 weight percent of an anhydride of a $C_{4-6}$ ethylenically unsaturated dicarboxylic acid such as maleic anhydride.

The impact modifier may be a polymer comprising from 60 to 100 weight percent of butyl acrylate and from 0 to 40 weight percent of one or more $C_{1-2}$ alkyl acrylates or methacrylates.

The compositions of the present invention are generally prepared by dry mixing the ingredients, then extruding them. The components which need drying and/or conditioning are first dried. Typically the polyester and polycarbonate may be dried together at 275° F. (130° C.) for at least about 4 hours in a desiccant drier. The graft copolymer is dried at about 149° F. (65° C.) for at least about 3 hours in a standard hot air circulating drier. The other ingredients are dried as required. Ihe dry ingredients are then tumble blended in the required weight ratio and extruded. A suitable extruder includes single and twin-screw, extruders, preferably, a twin screw co-rotating extruder. The extruder is operated at temperatures above the melting temperature of the components. Typically the temperature is from 200°-300° C., preferably 250° C. and the extruder is operated at a screw speed from 100 to 150 rpm, preferably 120 rpm, for a 40 mm co-rotating twin-screw extruder. One skilled in the art will be able to adjust temperatures and screw speeds as required.

Due to the low solubility of PET in most commercial solvents, solution blending is not desirable to prepare the compositions of the present invention.

The polymer blend may leave the extruder in the form of strands, sheets or a profile such as a rod or tube. If the blend is in the form of strands, it may be chopped to pellets. The pellets may be used in a conventional manner to mold objects. In using the pellets, it is normal to dry them before use to drive off moisture acquired during handling. Dying procedures are well known to those skilled in the art, typical conditions are 275° F. at 4 hours in a desiccant drier.

The pellets may be compounded with suitable fillers, processing aids, fibrous reinforcing materials, pigments, mold release aids, nucleating systems UV stabilizers, flame retardants and other conventional additives. Suitable fillers include particulate inorganic fillers such as calcium carbonate, mica, Kaolin, talc and metal oxides such as $MgO$, $TiO_2$, $BeO$, $ZnO$. Processing aids include lubricants such as fatty acids. Fibrous reinforcing materials include fibers of glass, ceramic or metal up to about 2 cm (¾") in length. The fibrous reinforcing material may be present in the compositions of the present invention in an amount from 0 up to 30, preferably 5 to 25, most preferably 10 to 20 weight percent. Pigments and mold release agents are well known to those skilled in the art. A particularly useful nucleating system is disclosed in applicant's co-pending U.S. patent application Ser. No. 278,342.

A mixture of the dry blended, pellets is fed to an injection molding machine. The machine is operated at temperature and pressure conditions to injection mold the composition.

The present invention will be illustrated by the following Examples in which, parts are parts by weight (e.g. lb.) unless otherwise specified.

EXAMPLE 1

A mixture of polycarbonate:polyethylene terephthlate:graft copolymer in a 70:15:15 weight ratio was prepared. The polycarbonate was based on a bisphenol-A-type compound and is sold under the trademark LEXAN (grade 141). The polyethylene terephthalate was commercially available PET. The graft copolymer comprised a terpolymer of 40 weight percent styrene, 50 weight percent of a mixture of lower alkyl acrylates and methacrylates grafted onto a styrene-butadiene-styrene tri-block polymer. The tri-block polymer had a molecular weight of between 175,000 and 275,000.

The PC and PET were dried for 4 hours at 275° F. in a desiccant drier. The graft copolymer was dried for 3 hours at 149° F. in a hot air circulating oven. The materials were blended in the above weight ratio and extruded and chopped into pellets.

For comparison purposes, PC pellets were prepared in a similar manner.

Pellets of the composition according to the present invention, and those of the PC, were injection molded into test bars. The bars were then subjected to various tests. The tests and the results are set forth in Table 1.

TABLE 1

| Test | Method | Graft PC/PET/Copolymer 70 15 15 | PC |
|---|---|---|---|
| Tensile (Yield) PSI | ASTM D-638 | 9200 | 9500 |
| Elongation % | ASTM D-638 | 120 | 110 |
| Modulus MPSI | ASTM D-790 | 360 | 300 |
| IZOD ft.-lb./in notched, ⅛ inch thickness | ASTM D-256 | 14 | 15 |
| Heat Distortion | ASTM 10-1637 (at 264 psi) | 209° F. | 270° F. |

These results show the blend of PC:PET:graft copolymer has an improved modulus and comparable impact to the PC per se.

EXAMPLE 2

In a similar manner to Example 1 a blend of polycarbonate (LEXAN 114) polyethylene terphthalate:graft copolymer (graft copolymer of Example 1) in a weight ratio 50:25:25 was prepared. The composition was extruded as pellets. The pellets were then injection molded as test bars. The tensile strength, elongation at break, modulus, IZOD impact (notched) and heat distortion temperature of the test bars were determined. The results are set forth in table II.

TABLE II

| | | |
|---|---|---|
| Tensile (yield) PSI | ASTM D-638 | 8,675 |
| Elongation % | ASTM D-638 | 125 |
| Modulus MPSI | ASTM D-790 | 357 |
| IZOD ft.-lb./in notched ⅛ thickness | ASTM D-256 | 14 |
| HDT °F. | ASTM D-1673 (264 psi) | 196 |

EXAMPLE 3

In a similar manner to Example 1 a blend of polycarbonate:polyethylene terephthalate:graft copolymer (of Example 1) in a weight ratio 50:35:15 was prepared. The composition was extruded as pellets. The pellets were then injection molded as test bars. The tensile strength, elongation at break modulus, IZOD impact (notched) and heat distortion temperature of the test bars were determined. The results are set forth in table III.

TABLE III

| | | |
|---|---|---|
| Tensile (yield) PSI | ASTM D-638 | 8,445 |
| Elongation % | ASTM D-638 | 130 |
| Modulus MPSI | ASTM D-790 | 374 |
| IZOD ft.-lb./in notched ⅛ inch thickness | ASTM D-256 | 13 |
| HDT °F. | ASTM D-1673 (at 264 psi) | 176 |

EXAMPLE 4

In a similar manner to Example 1 a series of blends of polycarbonate:polyethylene terephthalate:graft copolymer (of Example 1) were prepared. In one series of blends the polycarbonate was kept at 70 weight percent. In a second series of blends the polycarbonate was kept at 60 weight percent. In a third series of blends the polycarbonate was kept at 50 weight percent. In each of the above series the ratio of graft copolymer and polyester was varied to makeup 100 weight percent. A simple blend comprising:

polycarbonate:polyester:graft copolymer (of Example 1) in a ratio of 40:15:45 was prepared.

For comparison purposes a binary blend of was prepared.

Each of the above blends was extruded as pellets and the pellets were injection molded as test bars. The IZOD impact (notched) in ft.-lb. per inch of the ⅛ inch thickness samples was determined (ASTM D-256). The results of the tests are shown in FIG. 1 which is a plot of IZOD impact against weight percent of graft copolymer.

EXAMPLE 5

Figure 1:
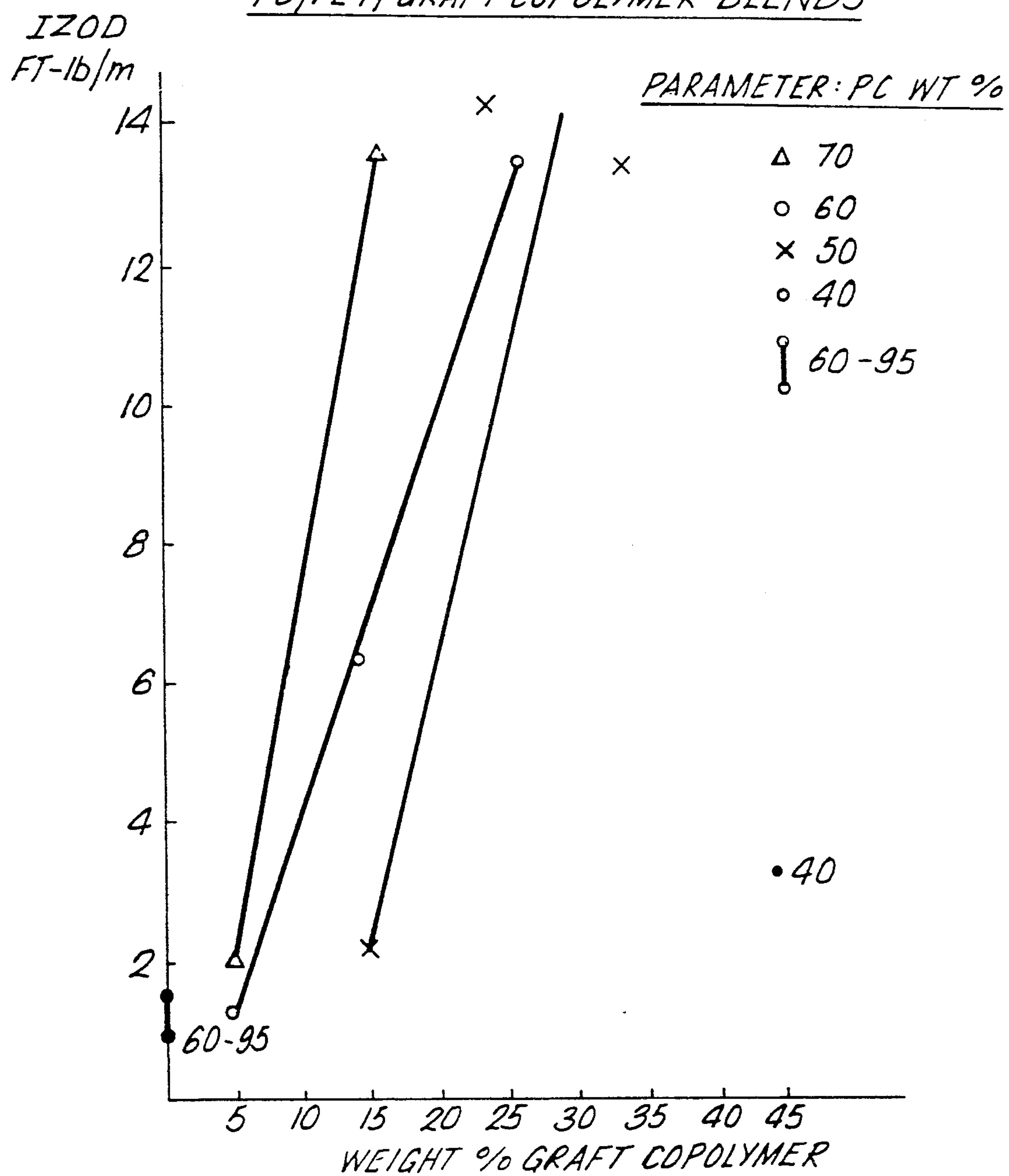
FIG. 1 illustrates a range of composition in which an improved impact resistance over polycarbonate:polyester blends may be obtained.

The composition of Example 1 of the present invention was injection molded. A polycarbonate (Sold under the trade mark LEXAN 101) was also injection molded using the same mold. The temperatures in the zones in the barrel of the injection molder, the reading on the rheostat (controlling the electric current to the nozzle heater) as a percentage of maximum current, the pressure in the injection molding machine and the mold temperature to obtain a commercially suitable product and process were recorded. The results are set forth in table IV.

TABLE IV

| | Molding Conditions | |
|---|---|---|
| Compound | Example 1 | Polycarbonate (LEXAN 101) |
| Barrel Temperatures | 525° F. 520° F. | 575° F. 565° F. |
| Rheostat (to nozzle %) | 50 | 60 |
| Molding Pressure | 3000 psi | 7000 psi |
| Mold temperature | 170° F. | 175° F. |

The data shows that the compositions of the present invention have a better flow (e.g. less pressure) at lower temperatures, which indicates better processability over polycarbonate.

What is claimed is:

1. A polymer alloy comprising:

(a) from 50 to 75 weight % of one or more homo-and copolycarbonates are based on a diphenol selected from the group consisting of 4,4'dihydroxydiphenyl; 2,2-bis-(4-hydroxyphenyl) propane; 2,4-bis-(4-hydroxyphenyl)-2-methylbutane; 1,1-bis, (4-hydroxyphenol)-cycloohexane; beta,beta-bis(4-hydroxyphenyl)-p-diisopropylbenzene; 2,2-bis(3-chloro-4-hydroxyphenyl) propane, 2,2-bis-(3,5-dichloro-4-hydroxyphenyl) propane; and 2,2-bis-(3,5-dichloro-4-hydroxyphenyl) propane;

(b) from 15 to 35 weight % of a polymer select from the group consisting of polyethylene terephthalate and polybutylene terephthalate;

(c) from 10 to 35 weight % of a graft copolymer consisting of a terpolymer of:

(i) from 30 to 65 parts by weight one or more monomers selected from the group consisting of styrene, alpha-methyl styrene, para-methyl styrene, paratertiary butyl styrene and dimethyl styrene;

(ii) from 8 to 20 parts by weight one or more monomers selected from the group consisting of butyl acrylate, ethyl hexyl acrylate and a mixture thereof;

(iii) from 15 to 40 parts by weight of methyl methacrylate;

which terpolymer is grafted to from 4 to 12 parts by weight of linear and radial di- or tri-block copolymers having a molecular weight from 175,000 to 275,000 selected from the group consisting of styrene-butadiene-styrene tri-block copolymers and styrene-isoprene-styrene tri-block copolymers.

2. A polymer alloy according to claim 1 wherein said polycarbonate is based on 2,2'bis-(4-hydroxyphenol) propane.

3. A polymer alloy according to claim 2, wherein component (b) is polyethylene terephthalate.

4. A polymer alloy according to claim 2, wherein component (b) is polybutylene terephthalate.

* * * * *